United States Patent [19]
Turillon et al.

[11] 4,135,621
[45] Jan. 23, 1979

[54] HYDROGEN STORAGE MODULE

[75] Inventors: Pierre P. Turillon, Ramsey; Gary D. Sandrock, Ringwood, both of N.J.

[73] Assignee: The International Nickel Company, Inc., New York, N.Y.

[21] Appl. No.: 881,034

[22] Filed: Feb. 24, 1978

[51] Int. Cl.² .................. B65D 25/00; F17C 11/00; C01B 1/26; F16L 55/04
[52] U.S. Cl. ........................ 206/0.7; 34/15; 55/523; 62/48; 220/3; 220/88 R; 423/248; 423/648 R
[58] Field of Search ............. 206/0.7; 220/88 R, 3; 423/248, 648; 55/523; 34/15; 62/48; 138/26, 28

[56] References Cited
U.S. PATENT DOCUMENTS

| | | | |
|---|---|---|---|
| 78,564 | 6/1868 | Austin | 138/28 |
| 933,152 | 9/1909 | Avery | 206/0.7 |
| 2,042,635 | 6/1936 | Schellens | 55/523 |
| 2,356,334 | 8/1944 | Maude et al. | 206/0.7 |
| 3,375,676 | 4/1968 | Reilly, Jr. et al. | 34/15 |
| 3,508,414 | 4/1970 | Wiswall, Jr. et al. | 62/48 |
| 3,516,263 | 6/1970 | Wiswall, Jr. et al. | 62/48 |
| 3,690,500 | 9/1972 | Remane | 220/3 |
| 3,922,872 | 12/1975 | Reilly et al. | 423/248 |
| 3,931,395 | 1/1976 | Beckert et al. | 423/648 |
| 4,080,431 | 3/1978 | Moss | 55/523 |

*Primary Examiner*—William T. Dixson, Jr.
*Attorney, Agent, or Firm*—E. C. MacQueen; Francis J. Mulligan, Jr.

[57] ABSTRACT

Discloses a hydrogen storage module comprising a fluted tube section closed at each end with a gas permeable porous plug and containing a metal adapted to form a hydride or the hydride of such metal.

4 Claims, 2 Drawing Figures

HYDROGEN STORAGE MODULE

BACKGROUND OF THE INVENTION

Hydrogen is stored conventionally as a gas in steel cylinders at high pressures (e.g., 2,000 psi) and at lower pressures as a liquid in insulated containers. Both methods of storage require comparatively bulky storage containers. In addition to their unwieldy size, such containers are inconvenient due to the high pressure required for gas storage in cylinders and the ever present danger of gaseous hydrogen evolving from boiling-off of the liquid form.

Within recent years, considerable attention has been focused on the storage of hydrogen as a metallic compound, or hydride, or various substances. Metal hydrides can store large amounts of hydrogen at low and even sub-atmospheric pressures in relatively small volumes. This low pressure storage of hydrogen is relatively safe and allows the construction of hydrogen containers having forms significantly different than those presently known.

Hydridable metals are changed with hydrogen by introducing pressurized gaseous hydrogen into valved containers. The hydrogen gas reacts exothermically with the metal to form a compound. Discharging of the metal hydride is accomplished by opening the valve of the container, to permit decomposition of the metal hydride, an endothermic reaction. It has been found expedient when gas is desired from the storage vessel to heat the storage vessel thereby increasing the flow of hydrogen or providing hydrogen at pressures substantially above atmospheric.

During the adsorption/desorption process, the hydridable metal has been found to expand and contract as much as 25% in volume as a result of hydrogen introduction and release from the metal lattice. Such dimensional change leads to fracture of the metal powder particles into fine particles. After several such cycles, the powder self-compacts causing inefficient hydrogen transfer. Additionally, and of even greater significance, high stresses due to the compaction of the powder and expansion during hydride formation are directed against the walls of the storage container. The stress within the powder has been observed to accumulate until the yield strength of the container is exceeded whereupon the container plastically deforms, buckles or bulges and eventually ruptures. Such rupture is extremely dangerous since a fine, pyrophoric powder is violently expelled by a pressurized, flammable hydrogen gas. Small, experimental cylinders of the aforedescribed type have indeed been found to burst when subjected to repetitive charging/discharging conditions.

The problem of expansion and compaction has been recognized in the art to the extent that containers are only partially filled with hydridable metal powders. The problem of hydridable metal powder particle breakdown has been addressed in U.S. Pat. No. 4,036,944 wherein a thermoplastic elastomer binder is used to form pellets of the hydridable metal particles. Although this provides a solution to a portion of the problem of hydrogen storage, polymers are notoriously poor heat conductors and are subjected to thermal deterioration. Since heat is generated during hydrogen charging and since heat may, in many cases, be added during discharging, such polymer containing pellets appear to be only partially useful under somewhat restrictive operational conditions.

Additional problems exist in the storage and transport of hydridable metals. There is a need for a means whereby hydridable metals can be shipped from the maker and loaded into pressure vessels without allowing the metal to react to any significant extent with atmospheric gasses and moisture. A more difficult problem arises when it is required to move hydridable metal in the gas-charged condition.

DISCOVERY OBJECTS AND DRAWINGS

It has now been discovered that by means of a novel structure, these difficulties and disadvantages can be avoided.

It is an object of the present invention to provide a novel hydrogen storage module.

Other objects and advantages will become apparent from the following description taken in conjunction with the drawing in which:

FIG. 1 is an external view of a hydrogen storage module of the present invention; and FIG. 2 is a cross-sectional view of the module of FIG. 1 along line 2—2.

Generally speaking, the present invention contemplates a hydrogen storage module comprising a fluted tube section of generally circular cross section crimped closed on both ends over a gas-permeable filter disk. Within the closed tube section, is a charge of hydridable metal (or a hydride thereof) occupying no greater than about 78% of the volume of the tube section when the metal is in the hydrogen-free condition. The gas-permeable filter disk at each end of the tube section has metal crimped over it only on the periphery thereof and that metal of the crimp has depressed, generally radially-extending paths therein so as to provide means of gas passage in the event one module presses tightly against another or against a flat surface.

The module is advantageously of such a configuration that the ratio of length to diameter is low, for example, the ratio is in the range of about 1 to 10 and, advantageously in the range of 1 to 6. Again, advantageously, the ends of the module adjacent the filter disks are of circular cross section with a diameter less than the diameter of the tube section proper. The fluting along the main portion of the tube section is so constructed that the radius of curvature of the rounded grooves of the flutes is less than the radius of curvature of the tube section itself. This is to ensure the availability of gas passage space between undeformed tube sections even when tube section modules tend to nest with one another.

DESCRIPTION OF THE DRAWING

Referring now to the drawing.

Figure 1:
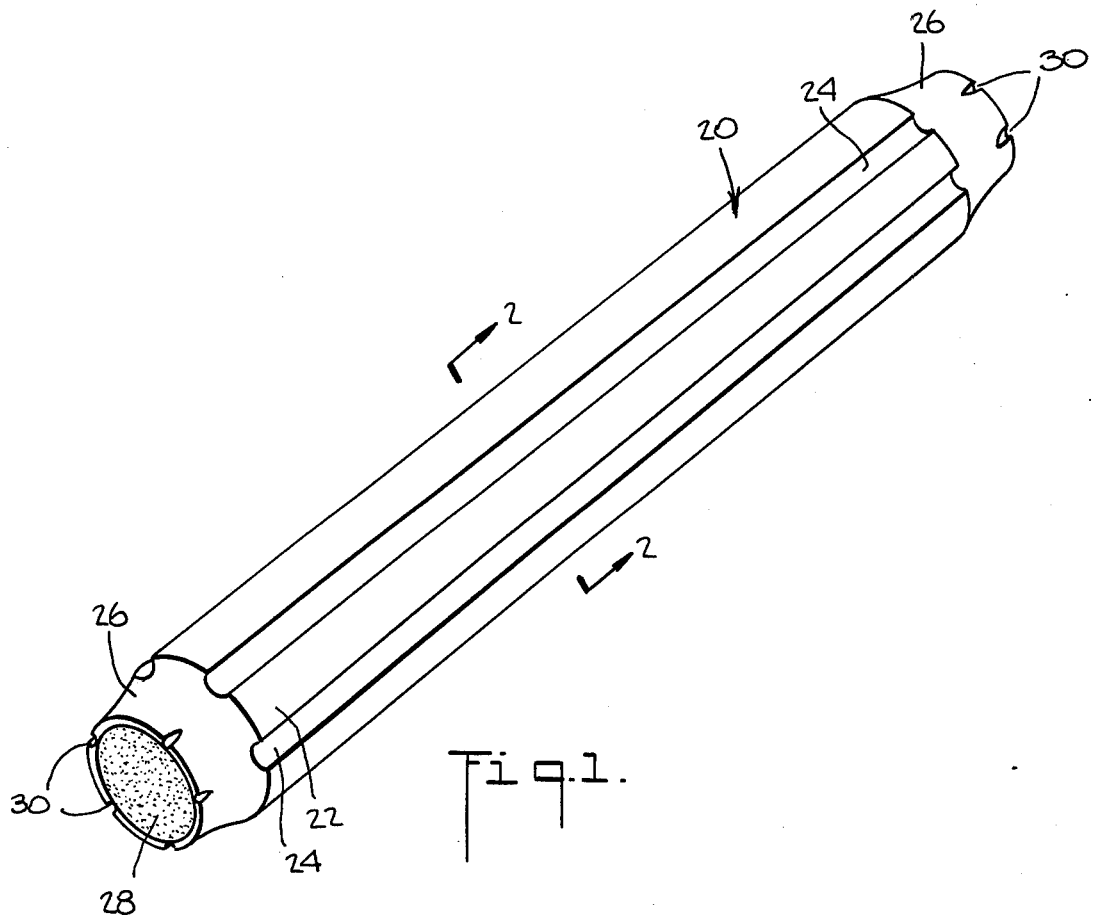
FIG. 1 shows an external view of module 20 comprising tube section 22 having a plurality of flutes 24 and reduced end sections 26. Reduced end sections 26 are generally of circular cross section and are plugged with gas-permeable plugs 28. Tube section 22 is made of a heat conductive metal such as aluminum, copper or an alloy thereof. Gas-permeable plugs 28 can be made of porous sintered metal such as aluminum, copper, nickel or the like. Metal of tube-section 22 is crimped over the peripheries of plugs 28 in such fashion so that generally radially-extending gas passage channels exist in the crimped metal. Module 20 is designed to be used in plurality within an outside container as disclosed in copending U.S. application Ser. No. 880,959 in the names of the instant inventors. When modules 20 are used in plurality or in any container having a flat wall, gas passage channels 30 tend to assure that hydrogen can flow to and from porous plugs 28 even if the end of a module is forced against an abutting surface.
Figure 2:
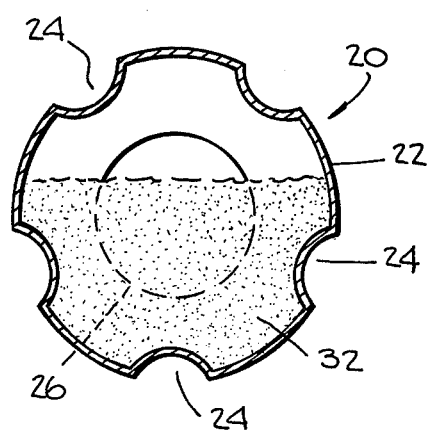
FIG. 2 shows module 20 in cross section containing hydrogen storage medium 32 in the hydrogen charged condition. In this condition, the medium is in the form of a fine powder having its greatest volume. Upon discharge, the powder shrinks in volume so as to occupy no greater than about 60% of the internal volume of the module. Those skilled in the art will appreciate that metals and metallic compounds such as $CaNi_5$, FeTi, $Mg_2Ni$, V, Mg etc., can be used as hydrogen storage medium 32.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A hydrogen storage module adapted to be employed in plurality inside a pressure containment means to store hydrogen as metallic hydride comprising
   (A) A fluted tube section of metal having good thermal conductivity, said section having a low length to diameter ratio, crimped closed at each end over the periphery of
   (B) a microporous filter disc,
   (C) the metal crimped over said periphery of said microporous filter disc having depressed, generally radially extending paths therein and
   (D) said fluted tube section being filled by said metal of said metal hydride to an extent of no greater than 78% of the volume of the tube section when the metal of the hydride is in a hydrogen-free condition.

2. A hydrogen storage module as in claim 1 wherein the ends of the tube section are generally circular and of a reduced diameter.

3. A hydrogen storage module as in claim 1 wherein the microporous filter disc is a disc of sintered metal.

4. A hydrogen storage module as in claim 1 wherein the length to diameter ratio is in the range of 1 to 6.

* * * * *